(12) United States Patent
Valley

(10) Patent No.: US 9,209,700 B2
(45) Date of Patent: Dec. 8, 2015

(54) MAGNETIC SENSING TECHNIQUE FOR POWER SUPPLY SYSTEMS

(71) Applicant: TEXAS INSTRUMENTS INCORPORATED, Dallas, TX (US)

(72) Inventor: Richard L. Valley, Nashua, NH (US)

(73) Assignee: Texas Instruments Incorporated, Dallas, TX (US)

( * ) Notice: Subject to any disclaimer, the term of this patent is extended or adjusted under 35 U.S.C. 154(b) by 268 days.

(21) Appl. No.: 13/873,902

(22) Filed: Apr. 30, 2013

(65) Prior Publication Data

US 2014/0268923 A1 Sep. 18, 2014

Related U.S. Application Data

(60) Provisional application No. 61/781,483, filed on Mar. 14, 2013.

(51) Int. Cl.
*H02M 3/335* (2006.01)
*H02M 1/00* (2007.01)

(52) U.S. Cl.
CPC .. *H02M 3/33523* (2013.01); *H02M 2001/0003* (2013.01)

(58) Field of Classification Search
CPC ............... H02M 2001/0009; H02M 3/33507; H02M 3/33523; H02M 3/33592
USPC .......... 363/21.12, 21.13, 21.14, 21.15, 21.16, 363/21.17, 21.18, 79
See application file for complete search history.

(56) References Cited

U.S. PATENT DOCUMENTS

| | | | | |
|---|---|---|---|---|
| 5,497,311 | A * | 3/1996 | Hanawaka | 363/21.03 |
| 2009/0021968 | A1* | 1/2009 | Komatsu et al. | 363/126 |
| 2010/0315838 | A1* | 12/2010 | Mao et al. | 363/16 |
| 2014/0003098 | A1* | 1/2014 | Park et al. | 363/21.16 |
| 2014/0029316 | A1* | 1/2014 | Adragna | 363/21.18 |
| 2014/0085943 | A1* | 3/2014 | Lin et al. | 363/21.17 |
| 2014/0252981 | A1* | 9/2014 | Xie et al. | 315/291 |

* cited by examiner

*Primary Examiner* — Jue Zhang
*Assistant Examiner* — Lakaisha Jackson
(74) *Attorney, Agent, or Firm* — William B. Kempler; Frank D. Cimino

(57) ABSTRACT

One embodiment includes a power supply system including a transformer comprising a primary, secondary, and auxiliary winding that are magnetically coupled. The system also includes a switch stage that generates a current through the primary winding in response to activation of a switch based on a control signal that is generated based on a feedback voltage associated with the auxiliary winding. The current can be induced in the secondary winding. The system also includes an output stage coupled to the secondary winding and that generates an output voltage based on the current induced in the secondary winding. The system further includes a feedback stage coupled to the auxiliary winding and comprising a discriminator configured to determine a zero-current condition associated with the current induced in the auxiliary winding based on monitoring a change in slope of the feedback voltage and to measure the feedback voltage during the zero-current condition.

18 Claims, 4 Drawing Sheets

MAGNETIC SENSING TECHNIQUE FOR POWER SUPPLY SYSTEMS

RELATED APPLICATIONS

This application claims priority from U.S. Provisional Patent Application Ser. No. 61/781,483, filed 14 Mar. 2013, which is incorporated herein in its entirety.

TECHNICAL FIELD

This disclosure relates generally to electronic circuit systems, and specifically to a magnetic sensing technique for power supply systems.

BACKGROUND

Power supply circuits can be implemented in a variety of computer and/or wireless devices to provide power to circuit components therein. One example of a power supply system is a discontinuous flyback power regulator, in which current flow through a primary winding of a transformer induces current flow in a secondary winding of the transformer, such that an output voltage can be generated based on the current flow in the secondary winding. As a result of this configuration, the primary-side circuit components can be isolated from the secondary-side circuit components. To accurately regulate the operation of the discontinuous flyback power regulator, it may be necessary to determine the output voltage to maintain the output voltage at a given magnitude. However, to maintain isolation between the secondary-side circuit components and the primary-side circuit components, the output voltage can be measured based on a voltage in the windings of the transformer.

SUMMARY

One embodiment includes a power supply system that includes a transformer comprising a primary winding, a secondary winding, and an auxiliary winding that are magnetically coupled. The system also includes a switch stage that generates a current through the primary winding in response to activation of a switch based on a control signal that is generated based on a feedback voltage associated with the auxiliary winding. The current can be induced in the secondary winding. The system also includes an output stage coupled to the secondary winding and that generates an output voltage based on the current induced in the secondary winding. The system further includes a feedback stage coupled to the auxiliary winding and comprising a discriminator configured to determine a zero-current condition associated with the current induced in the secondary winding based on monitoring a change in slope of the feedback voltage and to measure the feedback voltage during the zero-current condition.

Another embodiment includes a method for regulating an output voltage in a power supply system. The method includes activating a switch based on a control signal to generate a current through a primary winding of a transformer. The current can be induced in a secondary winding of the transformer based on magnetic coupling. The method also includes generating the output voltage based on the current induced in the secondary winding. The method also includes monitoring characteristics of a feedback voltage that is generated based on energy induced in the auxiliary winding to determine a zero-current condition associated with the current induced in the secondary winding. The method further includes measuring the feedback voltage in response to determining the zero-current condition, and generating the control signal based on the measured feedback voltage.

Another embodiment includes a power supply system. The system includes a transformer comprising a primary winding, a secondary winding, and an auxiliary winding that are magnetically coupled. The system also includes a switch stage comprising a switching controller that is configured to generate a control signal to activate a switch to generate a current through the primary winding. The current can be induced in the secondary winding. The system also includes an output stage coupled to the secondary winding and configured to generate an output voltage based on the current induced in the secondary winding. The system further includes a feedback stage coupled to the auxiliary winding. The feedback stage includes a discriminator configured to determine a zero-current condition associated with the current induced in the secondary winding based on a change in slope of a feedback voltage associated with the auxiliary winding and to generate a trigger signal in response to determining the zero-current condition. The feedback stage further includes a sample-and-hold circuit configured to sample an instantaneous magnitude of the feedback voltage in response to the trigger signal and to provide to the switching controller for generation of the control signal based on the instantaneous magnitude.

DETAILED DESCRIPTION

This disclosure relates generally to electronic circuit systems, and specifically to a magnetic sensing technique for power supply systems. A power supply system, such as a discontinuous flyback power supply system, can include a transformer having a primary winding, a secondary winding, and an auxiliary winding that are magnetically coupled. A switching controller in a switch stage can implement a control signal to activate a switch to generate a current flow in the primary winding to store magnetic energy in the primary winding. Upon deactivation of the switch, the magnetic energy stored in the primary winding is transferred to each of the secondary winding and the auxiliary winding as respective induced currents. The power supply system can include an output stage that generates an output voltage based on the current induced in the secondary winding. The power supply system can also include a feedback stage that is configured to determine a zero-current condition associated with the current in the secondary winding and can be configured to measure a feedback voltage in response to the determination of the zero-current condition. The generation of the control signal can be based on the measured feedback voltage.

The feedback stage can include a discriminator that is configured to determine the zero-current condition. The discriminator can include a plurality of discriminator stages configured to provide a second derivative of the feedback voltage that can correspond to a change in slope of the feedback voltage. In response to the change in slope of the feedback voltage being approximately constant for a predetermined duration of time, the feedback voltage can be qualified.

Upon determining that the magnitude of the change in slope of the feedback voltage exceeds a predetermined value after qualification, the discriminator can determine the occurrence of the zero-current condition. In response, the discriminator can generate a trigger signal that can be provided to a sample-and-hold circuit to trigger a measurement of the instantaneous magnitude of the feedback voltage. The instantaneous magnitude of the feedback voltage can thus be provided to the switch controller for generation of the control signal to regulate the output voltage.

Figure 1:
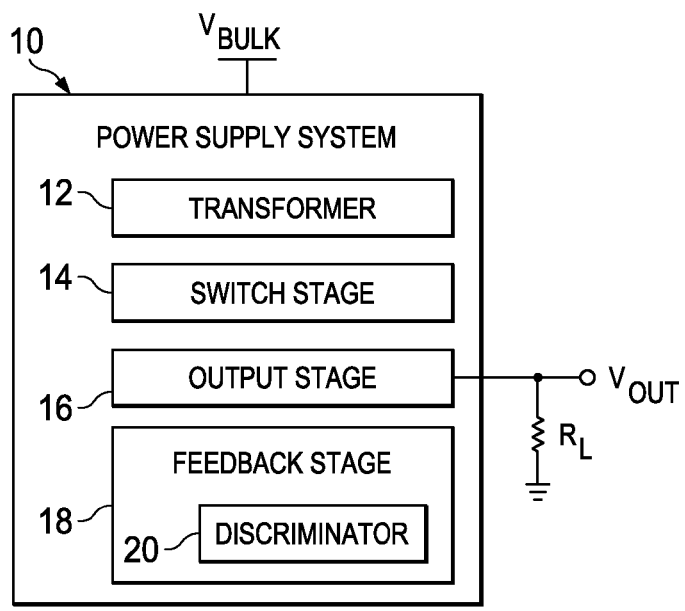
FIG. 1 illustrates an example of a power supply system.

FIG. 1 illustrates an example of a power supply system 10. The power supply system 10 can be implemented in any of a variety of applications to provide an output voltage $V_{OUT}$ to one or more circuit components, such as in a wireless communication device and/or handheld computer device. In the example of FIG. 1, the output voltage $V_{OUT}$ is demonstrated as being provided to a load resistor $R_L$. The power supply system 10 includes a transformer 12 that can include a primary winding, a secondary winding, and an auxiliary winding that are magnetically coupled with respect to each other. The primary winding of the transformer 12 can be coupled to a switch stage 14, the secondary winding of the transformer 12 can be coupled to an output stage 16, and the auxiliary winding of the transformer 12 can be coupled to a feedback stage 18. As an example, the power supply system 10 can be configured as a discontinuous flyback power supply, such that the current flow through the secondary winding of the transformer 12 can decrease to zero at each cycle of the switch stage 14, as described herein.

The switch stage 14 can include a switch controller configured to generate a control signal that activates a switch to generate a current through the transformer 12. The current can be provided through the primary winding via a voltage $V_{BULK}$, and the energy stored therein based on the current can be induced in the secondary and auxiliary windings based on the magnetic coupling of the secondary and auxiliary windings to the primary winding. The output voltage $V_{OUT}$ can be generated via the output stage 16 based on a current induced in the secondary winding of the transformer 12. The control signal generated by the switch controller in the switch stage 14 can have characteristics that can dictate the magnitude of the output voltage $V_{OUT}$. For example, the control signal can be implemented as a pulse-width modulation (PWM) signal that can have a pulse-width (e.g., duty-cycle) and/or frequency that are adjustable to set the amplitude of the output voltage $V_{OUT}$. For example, in a discontinuous flyback power supply, the control signal can dictate the delivery of energy from the primary winding of the transformer 12 to the secondary winding of the transformer 12, based on an on-time (i.e., pulse-width) and/or a frequency of the control signal to dictate a magnitude of the current through the primary winding of the transformer 12 and/or the rate of delivery of the energy to the secondary winding of the transformer 12. Therefore, to regulate the amplitude of the output voltage $V_{OUT}$, the feedback stage 18 can be configured to set the parameters (e.g., the pulse-width and/or the frequency) of the control signal. As a result, the parameters of the control signal can determine an average power delivered from the primary winding of the transformer 12 to the output stage 16 via the secondary winding of the transformer 12 to maintain the output voltage $V_{OUT}$ at an amplitude to provide sufficient power to the load $R_L$.

As described previously, the power supply system 10 can be configured as a discontinuous flyback power supply, such that the current flow through the secondary winding of the transformer 12 can decrease to zero at each cycle of the switch stage 14. Therefore, a feedback voltage that is associated with a voltage of the windings of the transformer 12 (e.g., the auxiliary winding) can provide a representation of the amplitude of the output voltage $V_{OUT}$ at the instant that the current in the secondary winding decreases to approximately zero, which is referred to hereinafter as a zero-current condition. However, the current that flows through the windings of the transformer 12 can be subject to various perturbations, such as a leakage plateau, leakage ringing, and/or descending slope resulting from the effective series resistance (ESR) in the output path of the output stage 16 during demagnetization of the transformer 12. Therefore, detection of the zero-current condition, particularly in the presence of the perturbations in the current of the transformer 12, can be important for an accurate determination of the amplitude of the output voltage $V_{OUT}$. For example, in a discontinuous flyback power supply, at the moment of the zero-current condition, resistive and/or inductive impedance effects in the secondary winding of the transformer 12 are approximately zero, such that a voltage drop across an output rectifier is predictable. Therefore, a substantially consistent representation of the output voltage $V_{OUT}$ can be determined based on the voltage across the auxiliary winding of the transformer 12. In addition, detection of the zero-current condition can be important for accurately regulating an average magnitude of the current in the secondary winding in the output stage 16. Furthermore, for higher frequency operation and to be consistent with low standby power performance, the determination of the zero-current condition can be required in a duration of time that is less than the period of a typical perturbing signal, which can have a frequency between approximately one megahertz and greater than ten megahertz.

To detect the zero-current condition for an accurate measurement of the feedback voltage, and thus the output voltage $V_{OUT}$, the feedback stage 18 includes a discriminator 20. The discriminator 20 can be configured to monitor the feedback voltage associated with the auxiliary winding of the transformer 12 to determine the zero-current condition, and can be configured to generate a trigger signal that can initiate a capture of an instantaneous magnitude of the feedback voltage, which is associated with the amplitude of the output voltage $V_{OUT}$. As an example, the discriminator 20 can be configured to monitor a second derivative of the feedback voltage that corresponds to a change in slope of the feedback voltage. The discriminator 20 can implement a window comparator to compare the second derivative of the feedback voltage for a predetermined duration of time to qualify the feedback voltage. Subsequent to the qualification of the feedback voltage, upon the second derivative of the feedback voltage exceeding a predetermined magnitude, the discriminator 20 can identify the zero-current condition, and can trigger a capture of the instantaneous amplitude of the feedback voltage. For example, the discriminator 20 can identify the zero-current condition based on the magnitude of the second derivative of the feedback voltage increasing beyond a predetermined negative threshold dictated by the window comparator. Therefore, the qualification of the feedback voltage by the discriminator 20 can be effective for rejecting perturbations acting upon the output voltage $V_{OUT}$, such as leakage plateau, leakage ringing, and/or ESR induced slope, to allow for an accurate determination of the zero-current condition, and thus an accurate measurement of the feedback voltage.

Figure 2:
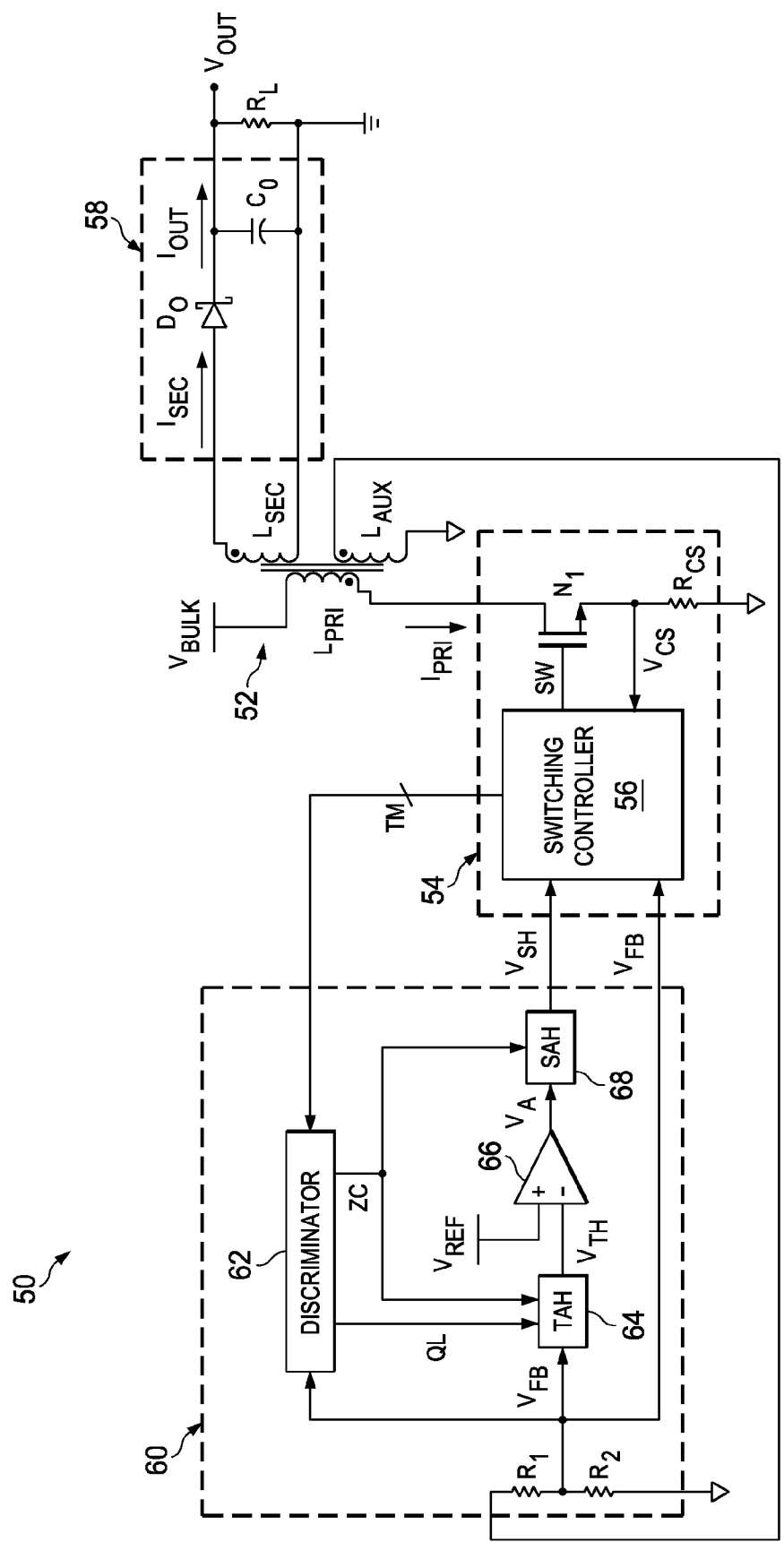
FIG. 2 illustrates an example of a power supply circuit.

FIG. 2 illustrates an example of a power supply circuit 50. The power supply circuit 50 includes a transformer 52 that includes a primary winding, a secondary winding, and an auxiliary winding, demonstrated in the example of FIG. 2 as an inductor $L_{PRI}$, an inductor $L_{SEC}$, and an inductor $L_{AUX}$, respectively. The primary winding $L_{PRI}$, the secondary winding $L_{SEC}$, and the auxiliary winding $L_{AUX}$ are magnetically coupled, such as based on being wound around a common core. The power supply circuit 50 also includes a switch stage 54 that is coupled to the primary winding $L_{PRI}$. The switch stage 54 includes a switching controller 56 that is configured to generate a control signal SW that is provided to a switch $N_1$, demonstrated in the example of FIG. 2 as an N-type metal-oxide semiconductor field-effect transistor (MOSFET). The control signal SW thus activates the switch $N_1$ to provide a current $I_{PRI}$ from a power voltage $V_{BULK}$ through the primary winding $L_{PRI}$ across a resistor $R_{CS}$. As an example, the control signal SW can be a pulse-width modulation (PWM) signal having a pulse-width that is set by the switching controller 56, as described herein. The switching controller 56 can also be configured to monitor a voltage $V_{CS}$ across the resistor $R_{CS}$, such as to monitor peak current control of the magnitude of the primary current $I_{PRI}$.

The power supply circuit 50 also includes an output stage 58 that is coupled to the secondary winding $L_{SEC}$ of the transformer 52. The current $I_{PRI}$ that is provided through the primary winding $L_{PRI}$ can store magnetic energy in the transformer 52 (e.g., in a core of the transformer 52), which can be transferred to the secondary winding $L_{SEC}$ in response to deactivation of the switch $N_1$. In response, a secondary current $I_{SEC}$ flows through the secondary winding $L_{SEC}$. In the example of FIG. 2, the secondary winding $L_{SEC}$ is demonstrated as having a polarity with respect to the primary winding $L_{PRI}$, such that the secondary current $I_{SEC}$ flows in response to the deactivation of the switch $N_1$. The secondary current $I_{SEC}$ flows through a Schottky diode $D_O$ and generates an output voltage $V_{OUT}$ across an output capacitor $C_O$ and a load resistor $R_L$. The output capacitor $C_O$ and the secondary current $I_{SEC}$ cooperate to generate an output current $I_{OUT}$ through the load resistor $R_L$ that has a substantially constant magnitude over time (e.g., approximately equal to a time-averaged magnitude of the secondary current $I_{SEC}$), such as to maintain a substantially constant magnitude of the output voltage $V_{OUT}$. After the initial flow of the secondary current $I_{SEC}$, the secondary current $I_{SEC}$ begins to decay. As an example, the power supply circuit 50 can be configured as a discontinuous flyback power supply, such that the secondary current $I_{SEC}$ can decrease to zero at each cycle of the switch stage 54 (e.g., activation of the switch $N_1$). As described herein, at the instant that the secondary current $I_{SEC}$ is approximately zero is a time at which the output voltage $V_{OUT}$ can be measured (e.g., via a feedback voltage, as described herein) to regulate the amplitude of the output voltage $V_{OUT}$.

The power supply circuit 50 further includes a feedback stage 60 that is coupled to the auxiliary winding $L_{AUX}$. The magnetic coupling of the auxiliary winding $L_{AUX}$ with the secondary winding $L_{SEC}$ results in the voltage across the secondary winding $L_{AUX}$ substantially tracking the voltage across the secondary winding $L_{SEC}$ with a predetermined scaling set by the relative wire turns used to realize the winding inductances of the auxiliary and secondary windings $L_{AUX}$ and $L_{SEC}$. The feedback stage 60 includes a first resistor $R_1$ and a second resistor $R_2$ that are coupled to the auxiliary winding $L_{AUX}$ and are arranged as a voltage-divider to generate a feedback voltage $V_{FB}$ that is associated with the voltage across the auxiliary winding $L_{AUX}$, which is associated with the voltage across the secondary winding $L_{SEC}$. During the time that the secondary current $I_{SEC}$ is flowing, the voltage across the secondary winding $L_{SEC}$ is substantially equal to the output voltage $V_{OUT}$ plus the forward voltage of the output rectifier $D_O$. Therefore, the feedback voltage $V_{FB}$ can be monitored to determine the magnitude of the output voltage $V_{OUT}$. For example, because the power supply circuit 50 is configured as a discontinuous flyback power supply, the output voltage $V_{OUT}$ can be regulated based on the instantaneous amplitude of the output voltage $V_{OUT}$ at approximately the zero-current condition corresponding to the magnitude of the secondary current $I_{SEC}$ being approximately equal to zero, and thus as determined by the instantaneous magnitude of the feedback voltage $V_{FB}$ at approximately the zero-current condition. The relationship of the feedback voltage $V_{FB}$ and the output voltage $V_{OUT}$ at approximately the zero-current condition can thus be determined as follows:

$$V_{FB}=(R_1+R_2)*(V_{OUT}+V_{DO})*N_A/(R_2*N_S) \quad \text{Equation 1}$$

Where:
$V_{DO}$ is a voltage across the Schottky diode $D_O$;
$N_A$ is a number of turns of the auxiliary winding $L_{AUX}$; and
$N_S$ is a number of turns of the secondary winding $L_{SEC}$.

In the example of FIG. 2, the feedback voltage $V_{FB}$ is provided to the switching controller 56 in the switch stage 54 and to a discriminator 62 in the feedback stage 60. The discriminator 62 is configured to detect the zero-current condition corresponding to the instant in time that the secondary current $I_{SEC}$ approaches approximately zero. The discriminator 62 is responsive to timing signals TM that are provided from the switching controller 56 to provide blanking functionality, as described in greater detail herein. For example, the timing signals TM can be generated based on a zero-crossing of the feedback voltage $V_{FB}$, such as can occur in response to the change of polarity of the voltage across the auxiliary winding $L_{AUX}$ based on the deactivation of the switch $N_1$. The discriminator 62 can thus provide a qualification signal QL to indicate that the feedback voltage $V_{FB}$ is qualified for measurement, such as based on substantially sufficient mitigation of non-ideal perturbations of the voltage across the auxiliary winding $L_{AUX}$, and a trigger signal ZC to indicate instantaneous measurement of the feedback voltage $V_{FB}$.

Figure 3:
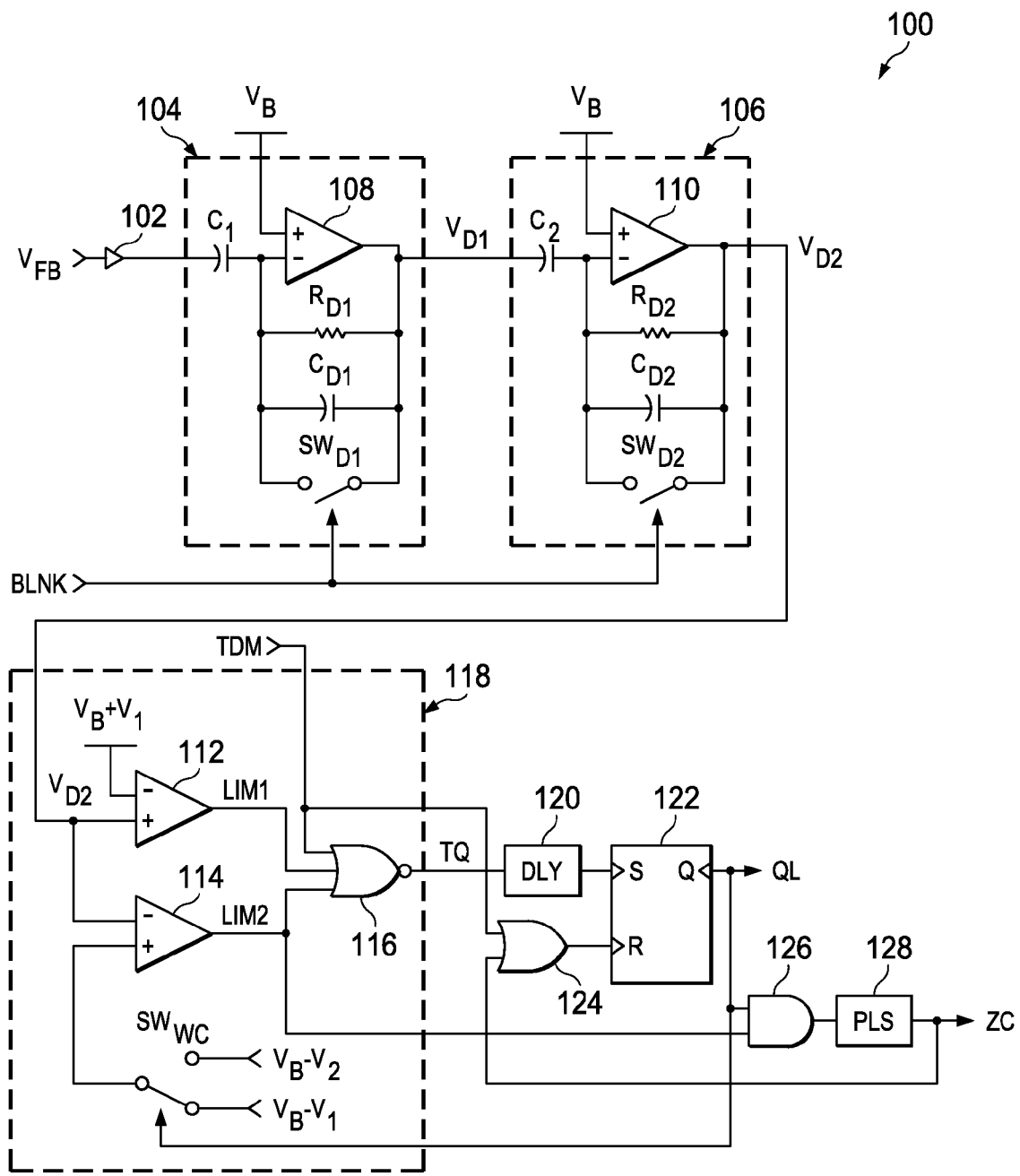
FIG. 3 illustrates an example of a discriminator circuit.

FIG. 3 illustrates an example of a discriminator circuit 100. The discriminator circuit 100 can correspond to the discriminator 62 in the example of FIG. 2. Thus, the discriminator circuit 100 is configured to detect the zero-current condition associated with the secondary current $I_{SEC}$ based on monitoring the feedback voltage $V_{FB}$, such as to indicate measurement of the instantaneous amplitude of the feedback voltage $V_{FB}$ used to regulate the output voltage $V_{OUT}$. Therefore, reference is to be made to the example of FIG. 2 in the following description of the example of FIG. 3.

The feedback voltage $V_{FB}$ is provided at an input of the discriminator circuit 100 to a buffer 102. The discriminator circuit 100 includes a first discriminator stage 104 and a second discriminator stage 106. In the example of FIG. 3, each of the first and second discriminator stages 104 and 106 are arranged substantially the same. The first discriminator stage 104 includes a capacitor $C_1$ that interconnects the buffered feedback voltage $V_{FB}$ and an inverting input of an operational amplifier (OP-AMP) 108. The OP-AMP 108 has a non-inverting input that is coupled to a predetermined DC bias voltage $V_B$. The first discriminator stage 104 also includes a resistor $R_{D1}$, a capacitor $C_{D1}$, and a switch $SW_{D1}$ that are arranged in parallel between the inverting input and an output of the OP-AMP 108. The feedback resistor $R_{D1}$ can provide a bias level at an output of the OP-AMP 108, such that the OP-AMP 108 can output a deviation in magnitude between the voltage $V_{D1}$ and the bias voltage $V_B$. Therefore, the effect of the OP-AMP 108, the capacitor $C_1$, and the parallel-connected resistor $R_{D1}$ and capacitor $C_{D1}$ is to provide a voltage $V_{D1}$ at the output of the OP-AMP 108 that can correspond to a first derivative of feedback voltage $V_{FB}$. Thus, the voltage $V_{D1}$ can correspond to a slope of the feedback voltage $V_{FB}$.

Similarly, the second discriminator stage 106 includes a capacitor $C_2$ that interconnects the voltage $V_{D1}$ and an inverting input of an OP-AMP 110. The OP-AMP 110 has a non-inverting input that is coupled to the bias voltage $V_B$. The second discriminator stage 106 also includes a resistor $R_{D2}$, a capacitor $C_{D2}$, and a switch $SW_{D2}$ that are arranged in parallel between the inverting input and an output of the OP-AMP 110. The feedback resistor $R_{D2}$ can provide a bias level at an output of the OP-AMP 110, such that the OP-AMP 110 can output a deviation in magnitude between the voltage $V_{D2}$ and the bias voltage $V_B$. Therefore, the effect of the OP-AMP 110, the capacitor $C_2$, and the parallel-connected resistor $R_{D2}$ and capacitor $C_{D2}$ is to provide a voltage $V_{D2}$ at the output of the OP-AMP 110 that can correspond to a second derivative of feedback voltage $V_{FB}$. Thus, the voltage $V_{D2}$ can correspond to a change in the slope of the feedback voltage $V_{FB}$.

The switches $SW_{D1}$ and $SW_{D2}$ can be implemented to provide blanking control of the first and second discriminator stages 104 and 106. In the example of FIG. 3, the switches $SW_{D1}$ and $SW_{D2}$ are controlled by a blanking signal BLNK that can be provided, for example, by the switch controller 56 as one of the timing signals TM. For example, the switch controller 56 can detect a zero-crossing associated with the magnitude of the feedback voltage $V_{FB}$, and can assert the blanking signal BLNK for a predetermined duration of time (e.g., approximately 250 nanoseconds). As a result, the switches $SW_{D1}$ and $SW_{D2}$ can be closed to couple the inverting input and the output of the respective OP-AMPs 108 and 110 to substantially discharge the capacitors $C_1$, $C_2$, $C_{D1}$, and $C_{D2}$. As a result, the capacitors $C_1$, $C_2$, $C_{D1}$, and $C_{D2}$ can be initialized at the zero-crossing of the feedback voltage $V_{FB}$, and an initial leakage plateau that is exhibited on the output voltage $V_{OUT}$, and thus the feedback voltage $V_{FB}$, that could cause large voltage magnitude swings on the capacitors $C_1$, $C_2$, $C_{D1}$, and $C_{D2}$ is not propagated to the discriminator stages 104 and 106.

The voltage $V_{D2}$ corresponding to the second derivative, and thus the change in slope, of the feedback voltage $V_{FB}$ is provided to a non-inverting input of a first comparator 112 and to an inverting input of a second comparator 114. The first comparator 112 can provide an output signal LIM1 to a first input of a NOR-gate 116, and the second comparator 114 can provide an output signal LIM2 to a second input of the NOR-gate 116, such that the first and second comparators 112 and 114 and the NOR-gate 116 are collectively arranged as a window comparator 118. The first comparator 112 has an inverting input that is coupled to a voltage that is a sum of the bias voltage $V_B$ and a first offset voltage $V_1$. The second comparator 114 has a non-inverting input that is coupled to a switch $SW_{WC}$ that selects between a first voltage that is a difference between the bias voltage $V_B$ and the first offset voltage $V_1$ in a first state, and a second voltage that is a difference between the bias voltage and a second offset voltage $V_2$ in a second state, with the second offset voltage $V_2$ having a greater magnitude than the first offset voltage $V_1$. Initially, the switch $SW_{WC}$ is set to the first state, but later switches to the second state upon qualification of the feedback voltage $V_{FB}$, as described in greater detail herein.

In the example of FIG. 3, the first comparator 112 outputs a logic-low signal to the NOR-gate 116 to indicate that the voltage $V_{D2}$ is less than the voltage $V_B+V_1$ and the second comparator 114 outputs a logic-low signal to the NOR-gate 116 to indicate that the voltage $V_{D2}$ is greater than the voltage $V_B-V_1$ (i.e., $V_B$ minus $V_1$). The NOR-gate 116 can thus provide an output signal TQ having a logic-high state to indicate that the magnitude of the voltage $V_{D2}$ is within the window of magnitudes having a predetermined high limit of the voltage $V_B+V_1$ and having a predetermined low limit of the voltage $V_B-V_1$. Accordingly, the signal TQ is provided at a logic-high state at the output of the NOR-gate 116 to indicate that the change in slope of the feedback voltage $V_{FB}$ is within an acceptable range of magnitudes, such that leakage ringing acting upon the output voltage $T_{OUT}$, and thus the feedback voltage $V_{FB}$, has substantially mitigated.

In the example of FIG. 3, the NOR-gate 116 also includes a third input that is provided a delay signal TDM. The delay signal TDM can be provided, for example, by the switch controller 56 as one of the timing signals TM. For example, the switch controller 56 can detect a zero-crossing associated with the magnitude of the feedback voltage $V_{FB}$, which can occur in response to deactivation of the switch $N_1$, and can assert the delay signal TDM for a predetermined duration of time, such as proportional to a peak magnitude of the primary current $I_{PRI}$ (e.g., between approximately 500 and 1500 nanoseconds), such as dictated by the voltage $V_{CS}$. As an example, the delay signal TDM can be asserted for a longer predetermined duration of time than the blanking signal BLNK. The delay signal TDM can be provided at a logic-high value to set the output signal TQ of the NOR-gate 116 to a logic-low state to ensure that the feedback voltage $V_{FB}$ is not qualified, as described in greater detail herein, for the predetermined duration of time of the delay signal TDM. In other words, the delay signal TDM operates to substantially reject more severe leakage ringing that is exhibited on the voltage across the secondary winding $L_{SEC}$ and thus also the feedback voltage $V_{FB}$. Upon de-assertion of the delay signal TDM after the predetermined duration of time, the window comparator 118 can thus begin to operate to indicate that the voltage $V_{D2}$, and thus the change in slope of the feedback voltage $V_{FB}$, is within the acceptable range of magnitudes.

The signal TQ provided from the output of the NOR-gate 116 is provided to a delay circuit 120 that is coupled to an "S" input of an SR-latch 122. Thus, the delay circuit 120 is configured to delay the assertion of the signal TQ to the "S" input of the SR-latch 122 by a predetermined duration of time. The SR-latch 122 also includes an "R" input that is provided by an OR-gate 124 that is configured to AND the delay signal TDM and a zero-current signal ZC that is provided at an output of the discriminator circuit 100. Thus, if the voltage $V_{D2}$ remains within the acceptable range of magnitudes defined by the window comparator 118 for the predetermined duration of time defined by the delay circuit 120, the assertion of the signal TQ is provided to the "S" input of the SR-latch 122. In response, the SR-latch 122 provides a qualification signal QL at a "Q" output to indicate that the feedback voltage $V_{FB}$ has been qualified. The qualification of the feedback voltage $V_{FB}$ can provide indication to the feedback stage 60 to begin tracking the magnitude of the feedback voltage $V_{FB}$, as described in greater detail herein.

In response to assertion of the qualification signal QL, the switch $SW_{WC}$ can be switched from the first state to the second state to decrease the predetermined low limit of the range of acceptable magnitudes of the window comparator 118 from the voltage $V_B-V_1$ to the voltage $V_B-V_2$. Therefore, subsequent to qualification of the second derivative of the feedback voltage $V_{FB}$, the window comparator 118 is changed to a low-level comparator (e.g., via the comparator 114) having a low-level threshold voltage of $V_B-V_2$. As a result of the change of the function of the window comparator 118 to the low-level comparator, the discriminator circuit 100 can qualify the feedback voltage $V_{FB}$ in a duration of time that is less than a period of the leakage ringing that is acting upon the output voltage $V_{OUT}$, and thus the feedback voltage $V_{FB}$. Accordingly, the zero-current condition can be detected in a duration of time that is less than the period of the leakage ringing.

Subsequent to qualification of the feedback voltage $V_{FB}$, the discriminator circuit 100 can be configured to determine the zero-current condition based on a sudden change in a negative slope of the feedback voltage $V_{FB}$ that corresponds to a total demagnetization of the transformer 52. In the example of FIG. 3, the qualification signal QL and the output of the second comparator 114 are provided to respective inputs of an AND-gate 126. Therefore, subsequent to qualification of the feedback voltage $V_{FB}$, upon the magnitude of the voltage $V_{D2}$ decreasing less than the predetermined low limit of the window comparator 118 (e.g., the voltage $V_B$–$V_2$), the second comparator 114 can assert the signal LIM2. Thus, the signal LIM2 can be asserted in response to a substantially large negative change in slope of the second derivative of the feedback voltage $V_{FB}$ that occurs in response to substantially zero current in the secondary winding $L_{SEC}$ corresponding to the zero-current condition. In response, the AND-gate 126 can assert an output to a pulse generator 128 that generates the zero-current signal ZC as an output pulse. Thus, the zero-current signal ZC can thus provide indication of the zero-current condition, such that the feedback stage 60 can measure an instantaneous magnitude of the feedback voltage $V_{FB}$.

Referring back to the example of FIG. 2, the feedback stage 60 includes a track-and-hold circuit 64 that is configured to monitor the feedback voltage $V_{FB}$ in response to the qualification signal QL provided by the discriminator 62. For example, the qualification signal QL can be provided by the SR-latch 122, as described in the example of FIG. 3. As an example, the track-and-hold circuit 64 can include a switch and a capacitor arranged in series, such that the qualification signal QL can be implemented to close the switch in response to qualification of the feedback voltage $V_{FB}$. As a result, the capacitor of the track-and-hold circuit 64 can be charged with the feedback voltage $V_{FB}$ in response to closure of the switch by the qualification signal QL. The track-and-hold circuit 64 thus outputs a tracked voltage $V_{TH}$ that corresponds to the feedback voltage $V_{FB}$.

The feedback stage 60 also includes a gain amplifier 66 that receives the tracked voltage $V_{TH}$ at an inverting input and receives a reference voltage $V_{REF}$ at a non-inverting input. The gain amplifier 66 can be configured, for example, as an error amplifier that provides gain amplification (e.g., approximately 36 dB) of a difference between the tracked voltage $V_{TH}$ and the reference voltage $V_{REF}$. The gain amplifier 66 provides an amplified voltage $V_A$ corresponding to the difference between the tracked voltage $V_{TH}$ and the reference voltage $V_{REF}$ to a sample-and-hold circuit 68 that is responsive to the zero-current signal ZC, such as to substantially increase a dynamic range associated with the measurement of the feedback voltage $V_{FB}$. For example, the zero-current signal ZC can be provided by the AND-gate 126 (e.g., via the pulse generator 128), as described in the example of FIG. 3. For example, in response to the zero-current signal ZC, the track-and-hold circuit 64 can hold the magnitude of the feedback voltage $V_{FB}$, such as in response to an opening of the switch to decouple the track-and-hold circuit 64 from the feedback voltage $V_{FB}$. Thus, the amplified voltage $V_A$ generated by the gain amplifier 66 can substantially settle on the instantaneous magnitude of the feedback voltage $V_{FB}$. As another example, the sample-and-hold circuit 68 can include a switch and a capacitor arranged in series, such that the zero-current signal ZC can be implemented to close the switch in response to the determination of the zero-current condition. As an example, the closing of the switch can occur based on a slightly delayed version of the zero-current signal ZC, such as to provide enough time for the amplified voltage $V_A$ to substantially settle. Therefore, the sample-and-hold circuit 68 is configured to measure the instantaneous amplitude of the feedback voltage $V_{FB}$ at the approximate time of the zero-current condition based on measuring the amplified voltage $V_A$ that is held in the track-and-hold circuit 64.

The measured instantaneous amplitude of the amplified voltage $V_A$ is output from the sample-and-hold circuit 68 as a voltage $V_{SH}$. The voltage $V_{SH}$, which is representative of the instantaneous amplitude of the feedback voltage $V_{FB}$, and thus the output voltage $V_{OUT}$, is provided to the switching controller 56. Therefore, the switching controller 56 can generate the control signal SW based on the voltage $V_{SH}$. As described herein, the generation of the control signal SW based on the voltage $V_{SH}$ can describe changes in the characteristics of the control signal SW, such as pulse-width and/or frequency, for a given next cycle of the activation of the switch $N_1$. Therefore, the switching controller 56 can set the control signal SW to regulate the output voltage $V_{OUT}$ based on the magnitude of the output voltage $V_{OUT}$ at approximately the zero-current condition. Accordingly, the power supply circuit 50 can maintain isolation of the output stage 58 and the switch stage 54 while regulating the output voltage $V_{OUT}$ by accurately determining the occurrence of the zero-current condition and rejecting the perturbing signals (e.g., leakage plateau and leakage ringing).

Figure 4:
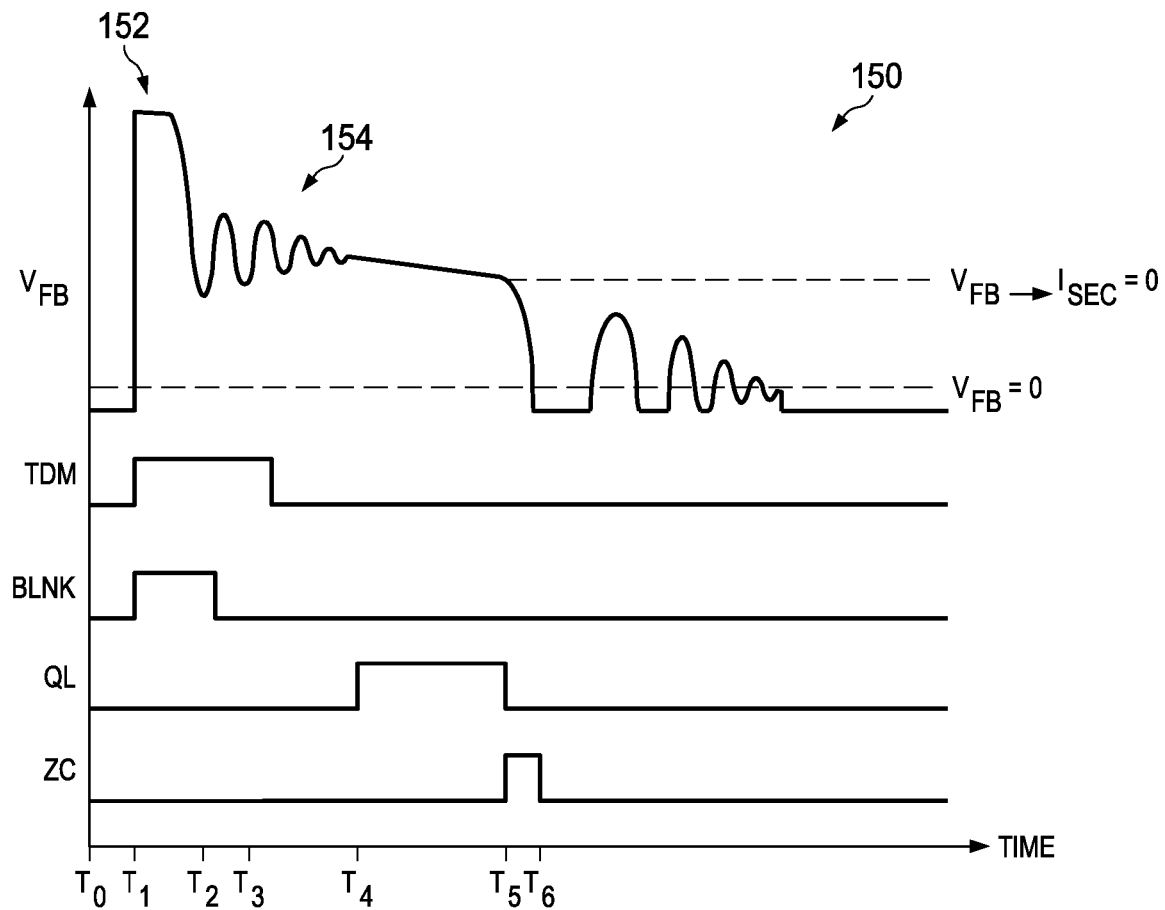
FIG. 4 illustrates an example of a timing diagram.

FIG. 4 illustrates an example of a timing diagram 150. The timing diagram 150 demonstrates a plurality of signals as a function of time. In the example of FIG. 4, the signals include the feedback voltage $V_{FB}$, the delay signal TDM, the blanking signal BLNK, the qualification signal QL, and the zero-current signal ZC. Therefore, reference is to be made to the examples of FIGS. 2 and 3 in the following description of the example of FIG. 4.

At a time $T_0$, the feedback voltage $V_{FB}$ is negative, and all of the signals TDM, BLNK, QL, and ZC are de-asserted. In the example of FIG. 4, it is to be understood that the feedback voltage $V_{FB}$ is demonstrated as clamped at a nominal magnitude less than zero, such as based on clamping circuitry (not shown in the example of FIG. 2). For example, at the time $T_0$, the switch $N_1$ can be closed to conduct the primary current $I_{PRI}$ through the primary winding $L_{PRI}$. At a time $T_1$, the switch $N_1$ is opened via the control signal SW. As a result, the feedback voltage $V_{FB}$ increases greater than zero based on the energy of the primary winding $L_{PRI}$ being transferred to the secondary winding $L_{SEC}$ and based on the magnetic coupling of the secondary winding $L_{SEC}$ and the auxiliary winding $L_{AUX}$. At the time $T_1$, the switching controller 56 can thus detect the zero-crossing of the feedback voltage $V_{FB}$, such that the switching controller 56 can assert the delay signal TDM and the blanking signal BLNK. In response, the switches $SW_{D1}$ and $SW_{D2}$ can be closed based on the assertion of the blanking signal BLNK to initialize the capacitors $C_1$, $C_2$, $C_{D1}$, and $C_{D2}$, and the delay signal TDM can ensure de-assertion of the signal TQ and a reset of the SR-latch 122. At a time $T_2$, the blanking signal BLNK can be de-asserted to open the switches $SW_{D1}$ and $SW_{D2}$, thus allowing the first and second discriminator stages 104 and 106 to begin collectively generating the voltage $V_{D2}$. As an example, the duration between the time $T_1$ and $T_2$ corresponding to the assertion of the blanking signal BLNK can be predetermined (e.g., 250 nanoseconds).

Beginning at the time $T_1$, the feedback voltage $V_{FB}$ can be momentarily affected by a leakage plateau, demonstrated at 152. Subsequent to the leakage plateau 152, the feedback voltage $V_{FB}$ can experience leakage ringing, demonstrated at 154. The assertion of the delay signal TDM can substantially reject the leakage plateau and the leakage ringing based on preventing operation of the discriminator circuit 100 to attempt to qualify the feedback voltage $V_{FB}$. At a time $T_3$, the delay signal TDM can be de-asserted, such that the qualification logic (e.g., the window comparator 118 and the SR-latch 122) can begin to attempt to qualify the feedback voltage $V_{FB}$. As an example, the delay signal TDM can have a predetermined duration that can correspond to a peak current magnitude of the primary current $I_{PRI}$, such as determined by the voltage $V_{CS}$.

At a time $T_4$, the qualification signal QL is asserted to indicate that the feedback voltage $V_{FB}$ has been qualified. As an example, the qualification logic (e.g., the window comparator 118 and the SR-latch 122) can have determined at the time $T_4$ that the magnitude of the voltage $V_{D2}$ corresponding to the slope of the feedback voltage $V_{FB}$ remained within the range of acceptable magnitudes defined by the window comparator 118 (e.g., between the voltage $V_B-V_1$ to the voltage $V_B+V_1$) for a predetermined duration of time dictated by the delay circuit 120. Thus, in the example of FIG. 4, the leakage ringing 154 has dampened just prior to the time $T_4$, such that upon assertion of the qualification signal QL at the time $T_4$, the discriminator circuit 100 can wait for the zero-crossing condition. Therefore, at the time $T_4$, the qualification signal QL is provided to the track-and-hold circuit 64, such that the track-and-hold circuit 64 can begin tracking the feedback voltage $V_{FB}$. In addition, at the time $T_4$, the qualification signal QL is provided to the switch $SW_{WC}$ to decrease the range of acceptable magnitudes of the voltage $V_{D2}$ of the window comparator 118.

At a time $T_5$, the feedback voltage $V_{FB}$ begins a rapid decrease in magnitude corresponding to a substantial total demagnetization of the transformer 52, and thus the approximate occurrence of the zero-current condition. At the time $T_5$, the voltage $V_{D2}$ thus decreases less than the predetermined low limit voltage $V_B-V_2$ to indicate the approximate occurrence of the zero-current condition. Thus, the second comparator 114 asserts the signal LIM2, such that the AND-gate 126 asserts an output to the pulse circuit 128. As a result, the zero-current signal ZC is provided as a pulsed-signal (having a pulse-width from the time $T_5$ to a time $T_6$) to the sample-and-hold circuit 68, and the qualification signal QL is de-asserted (e.g., via the OR-gate 124). Thus, at approximately the time $T_5$, the sample-and-hold circuit 68 can measure a substantially instantaneous magnitude of the amplified voltage $V_A$ that corresponds to the substantially instantaneous magnitude of the feedback voltage $V_{FB}$ at an approximate zero magnitude of the output current $I_{OUT}$. Accordingly, the switching circuit 56 can generate (e.g., set the characteristics of) the control signal SW, such as based on adjusting a pulse-width and/or amplitude of the control signal SW. Accordingly, the control signal SW can be set for the next cycle (e.g., activation of the switch $N_1$) for regulating the output voltage $V_{OUT}$.

Figure 5:
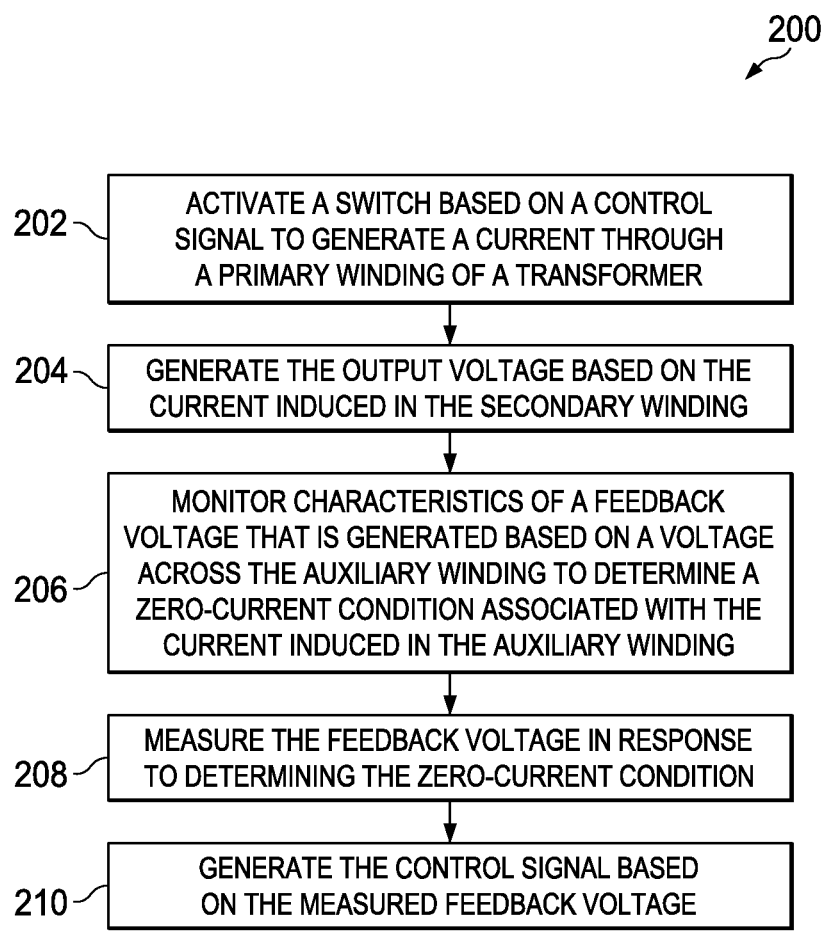
FIG. 5 illustrates an example of a method for regulating an output voltage in a power supply system.

In view of the foregoing structural and functional features described above, certain methods will be better appreciated with reference to FIG. 5. It is to be understood and appreciated that the illustrated actions, in other embodiments, may occur in different orders and/or concurrently with other actions. Moreover, not all illustrated features may be required to implement a method.

FIG. 5 illustrates an example of a method 200 for regulating an output voltage (e.g., the output voltage $V_{OUT}$) in a power supply system (e.g., the power supply circuit 50). At 202, a switch (e.g., the switch $N_1$) is activated based on a control signal (e.g., the control signal SW) to generate a current (e.g., the primary current $I_{PRI}$) through a primary winding (e.g., the primary winding $L_{PRI}$) of a transformer (e.g., the transformer 52). The current can be induced in a secondary winding (e.g., the secondary winding $L_{SEC}$) of the transformer based on magnetic coupling. At 204, the output voltage is generated based on the current (e.g., the secondary current $I_{SEC}$) induced in the secondary winding. At 206, characteristics (e.g., the change of the slope) of a feedback voltage (e.g., the feedback voltage $V_{FB}$) that is generated based on a voltage across the auxiliary winding are monitored to determine a zero-current condition associated with the current induced in the secondary winding. At 208, the feedback voltage is measured in response to determining the zero-current condition. At 210, the control signal is generated based on the measured feedback voltage (e.g., the voltage $V_{SH}$).

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power supply system comprising:
   a transformer comprising a primary winding, a secondary winding, and an auxiliary winding that are magnetically coupled;
   a switch stage configured to generate a current through the primary winding in response to activation of a switch based on a control signal that is generated based on a feedback voltage associated with the auxiliary winding, the current being induced in the secondary winding;
   an output stage coupled to the secondary winding and configured to generate an output voltage based on the current induced in the secondary winding; and
   a feedback stage coupled to the auxiliary winding and comprising a discriminator configured to determine a zero-current condition associated with the current induced in the secondary winding based on monitoring a change in slope of the feedback voltage and to measure the feedback voltage during the zero-current condition, wherein the discriminator further comprises a window comparator that is configured to establish a window of acceptable magnitudes for the change in the slope of the feedback voltage to qualify the feedback voltage for a predetermined duration of time before the feedback voltage is measured.

2. The system of claim 1, wherein the discriminator comprises a plurality of discriminator stages configured to measure the change in slope of the feedback voltage to determine the zero-current condition.

3. An integrated circuit (IC) comprising the feedback stage of the power amplifier system of claim 1.

4. The system of claim 1, wherein the discriminator is further configured to decrease a low-level threshold of the window subsequent to qualification of the feedback voltage such that the predetermined duration of time is less than a period of leakage ringing of the feedback voltage.

5. The system of claim 1, wherein the discriminator is configured to trigger measurement of the feedback voltage in response to the change in the slope of the feedback voltage exceeding a predetermined acceptable magnitude of the window for the change in the slope of the feedback voltage subsequent to the qualification of the feedback voltage.

6. The system of claim 5, wherein the plurality of timing signals comprises a blanking signal configured to discharge capacitors associated with the discriminator for a first predetermined duration of time subsequent to deactivation of the switch and a delay signal configured to disable measurement of the feedback voltage for a second predetermined duration of time subsequent to deactivation of the switch.

7. The system of claim 1, wherein the feedback stage comprises a sample-and-hold circuit configured to measure an instantaneous magnitude of the feedback voltage in response to a measurement trigger provided by the discriminator, the instantaneous magnitude being provided to the switching controller for generation of the control signal.

8. The system of claim 7, wherein the feedback stage further comprises a track-and-hold circuit configured to track the magnitude of the feedback voltage and an amplifier configured to amplify the tracked magnitude of the feedback voltage, the sample-and-hold circuit being configured to measure an instantaneous magnitude of the amplified tracked feedback voltage.

9. A power supply system comprising:
a transformer comprising a primary winding, a secondary winding, and an auxiliary winding that are magnetically coupled;
a switch stage comprising a switching controller that is configured to generate a control signal to activate a switch to generate a current through the primary winding, the current being induced in the secondary winding;
an output stage coupled to the secondary winding and configured to generate an output voltage based on the current induced in the secondary winding; and
a feedback stage coupled to the auxiliary winding and comprising:
a discriminator configured to determine a zero-current condition associated with the current induced in the secondary winding based on a change in slope of a feedback voltage associated with the auxiliary winding and to generate a trigger signal in response to determining the zero-current condition, wherein the discriminator further comprises a window comparator that is configured to establish a window of acceptable magnitudes for the change in the slope of the feedback voltage to qualify the feedback voltage for a predetermined duration of time before the feedback voltage is measured; and
a sample-and-hold circuit configured to sample an instantaneous magnitude of the feedback voltage in response to the trigger signal and to provide to the switching controller for generation of the control signal based on the instantaneous magnitude.

10. The system of claim 9, wherein the discriminator comprises:
a plurality of discriminator stages configured to measure the change in slope of the feedback voltage to determine the zero-current condition; and
logic configured to trigger measurement of the feedback voltage in response to the change in the slope of the feedback voltage exceeding a predetermined acceptable magnitude of the window for the change in the slope of the feedback voltage subsequent to the qualification of the feedback voltage.

11. The system of claim 10, wherein the logic is further configured to increase a range of magnitudes of the window subsequent to qualification of the feedback voltage such that the predetermined duration of time is less than a period of leakage ringing of the feedback voltage.

12. A method for regulating an output voltage in a power supply system, the method comprising:
activating a switch based on a control signal to generate a current through a primary winding of a transformer, the current being induced in a secondary winding of the transformer based on magnetic coupling;
generating the output voltage based on the current induced in the secondary winding;
monitoring characteristics of a feedback voltage that is generated based on a voltage across an auxiliary winding to determine a zero-current condition associated with the current induced in the secondary winding;
measuring the feedback voltage in response to determining the zero-current condition; and
generating the control signal based on the measured feedback voltage, wherein monitoring the characteristics of the feedback voltage comprises monitoring a second derivative of the feedback voltage via a plurality of discriminator stages to determine the zero-current condition.

13. The method of claim 12, further comprising disabling the monitoring of the second derivative of the feedback voltage for a predetermined duration of time subsequent to deactivation of the switch.

14. The method of claim 12, wherein monitoring the characteristics of the feedback voltage further comprises comparing the second derivative of the feedback voltage with a predetermined upper limit and a predetermined lower limit, the method further comprising qualifying the feedback voltage in response to the magnitude of the second derivative of the feedback voltage being less than the predetermined upper limit and greater than the predetermined lower limit for a predetermined duration of time.

15. The method of claim 14, wherein measuring the feedback voltage comprises measuring the feedback voltage in response to the second derivative of the feedback voltage decreasing less than the predetermined lower limit subsequent to qualification of the feedback voltage.

16. The method of claim 14, further comprising decreasing the predetermined lower limit subsequent to qualification of the feedback voltage.

17. A method for regulating an output voltage in a power supply system, the method comprising:
activating a switch based on a control signal to generate a current through a primary winding of a transformer, the current being induced in a secondary winding of the transformer based on magnetic coupling;
generating the output voltage based on the current induced in the secondary winding;
monitoring characteristics of a feedback voltage that is generated based on a voltage across the auxiliary winding to determine a zero-current condition associated with the current induced in the secondary winding;
measuring the feedback voltage in response to determining the zero-current condition; and
generating the control signal based on the measured feedback voltage, wherein measuring the feedback voltage comprises:
capacitively tracking a magnitude of the feedback voltage;
amplifying the tracked magnitude of the feedback voltage; and
sampling an instantaneous magnitude of the amplified tracked magnitude in response to a trigger signal corresponding to the zero-current condition.

18. A power supply system comprising:
- a transformer comprising a primary winding, a secondary winding, and an auxiliary winding that are magnetically coupled;
- a switch stage configured to generate a current through the primary winding in response to activation of a switch based on a control signal that is generated based on a feedback voltage associated with the auxiliary winding, the current being induced in the secondary winding;
- an output stage coupled to the secondary winding and configured to generate an output voltage based on the current induced in the secondary winding; and
- a feedback stage coupled to the auxiliary winding and comprising a discriminator configured to determine a zero-current condition associated with the current induced in the secondary winding based on monitoring a change in slope of the feedback voltage and to measure the feedback voltage during the zero-current condition, wherein the switch stage comprises a switching controller configured to generate a plurality of timing signals that are provided to the discriminator to substantially mitigate a leakage plateau and leakage ringing associated with the measurement of the feedback voltage.

* * * * *